(12) United States Patent
Brants et al.

(10) Patent No.: US 7,577,654 B2
(45) Date of Patent: Aug. 18, 2009

(54) SYSTEMS AND METHODS FOR NEW EVENT DETECTION

(75) Inventors: Thorsten H. Brants, Palo Alto, CA (US); Francine R. Chen, Menlo Park, CA (US); Ayman O. Farahat, San Francisco, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 358 days.

(21) Appl. No.: 10/626,856

(22) Filed: Jul. 25, 2003

(65) Prior Publication Data

US 2005/0021324 A1   Jan. 27, 2005

(51) Int. Cl.
G06F 7/00 (2006.01)
G06F 17/30 (2006.01)

(52) U.S. Cl. ......................................................... 707/6
(58) Field of Classification Search .................. 707/102
See application file for complete search history.

(56) References Cited

U.S. PATENT DOCUMENTS

| | | | |
|---|---|---|---|
| 5,835,905 A | 11/1998 | Pirolli et al. | |
| 6,012,073 A | 1/2000 | Arend et al. | |
| 6,131,089 A | 10/2000 | Campbell et al. | |
| 6,192,360 B1 | 2/2001 | Dumais et al. | |
| 6,411,962 B1 | 6/2002 | Kupiec | |
| 6,584,220 B2* | 6/2003 | Lantrip et al. ............... | 382/154 |
| 6,606,620 B1* | 8/2003 | Sundaresan et al. ............ | 707/3 |
| 6,961,954 B1 | 11/2005 | Maybury et al. | |
| 7,085,755 B2* | 8/2006 | Bluhm et al. .................. | 707/3 |
| 2002/0059602 A1 | 5/2002 | Macrae et al. | |
| 2003/0182631 A1* | 9/2003 | Tsochantaridis et al. .... | 715/531 |
| 2004/0002849 A1* | 1/2004 | Zhou .............................. | 704/4 |
| 2004/0006559 A1* | 1/2004 | Gange et al. .................... | 707/3 |
| 2005/0021490 A1* | 1/2005 | Chen et al. ...................... | 707/1 |
| 2006/0062451 A1* | 3/2006 | Li et al. ........................ | 382/159 |

OTHER PUBLICATIONS

Title: Interim Guidelines for Examination of Patent Applications for Patent Subject Matter Eligibility; Annex IV; pp. 50-57; Publication Date: Nov. 22, 2005.*

(Continued)

Primary Examiner—John R. Cottingham
Assistant Examiner—Kimberly Lovel
(74) Attorney, Agent, or Firm—Ray Sharpe LLP

(57) ABSTRACT

Techniques for new event detection are provided. For a new story and a corpus of stories, story-pairs based on the new story and each corpus story are determined. Adjustments to the importance of terms are determined based on story characteristics associated with each story. Story characteristics are based on direct or indirect characteristics. Direct story characteristics include authorship, language associated with a story and the like. Indirect story characteristics may include derived characteristics such as an ROI category characteristic, a same ROI characteristic, a same event-same source characteristic, an average story similarity characteristic or any other known or later developed characteristic associated with a story. Adjustments to the inter-story similarity metrics are then determined based on story characteristics and/or a weighting function. New event scores and/or new event categorizations for stories are determined based on the inter-story similarity metrics and the adjustments based on the story characteristics. Optionally new events are selected based on new event scores and a threshold value.

14 Claims, 8 Drawing Sheets

OTHER PUBLICATIONS

Author: Allan et al; Title: Topic Detection and Tracking Pilot Study Final Report; Date: 1998; Publisher: Darpa; Website: http://www.itl.nist.iaui/894.01/publications/darpa98/pdf/tdt2040.pdf.*

Allan, J. et al., "Detection, Bounds, and Timelines: UMass and TDT-3" in Proceedings of Topic Detection and Tracking Workshop (TDT-3), Vienna, Virgina, Feb. 2000.

Allan, J. et al., "On-line new event detection and tracking" in Proceedings of SIGIR-98, Melbourne, Australia, 1998, p. 37-45.

Allan, J., et al., "Topic-based novelty detection", Summer Workshop Final Report, Center for Language and Speech Processing, John Hopkins University, 1999.

Franz, M., et al., "First Story Detection: Combining similarity and novelty-based approaches", Slides at the TDT-2001 meeting, IBM, 2001.

Brants, T., et al., "Topic based document segmentation with probablistic latent semantic analysis", in International Conference on Information and Knowledge Management (CIKM), McLean, VA 2002.

Croft, W.B., et al., "Relevance feedback and personalization: A language modelling perspective" in DELOS Workshop: Personalisation and Recommender Systems in Digital Libraries, 2001.

Dunning, T.E., "Accurate Methods for the statistics of surprise and coincidence" in Computational Linguistics 19(1):61-74, 1993.

Hearst, M.A., "TextTiling: Segmenting text into multi-paragraph subtopic passages", in Computational Linguistics, 23(1):33-64, 1997.

Joachims, T., "Making large-scale svm learning practical", in Advances in Kernel-Methods Support Vector Learning, B. Schlkopf, C. Burges, A. Smola eds., MIT Press, 1999.

Joachims, T., "Text categorization with support vector machines: learning with many relevant features" in Proceedings of the 10th European Conference on Machine Learning, 1998, pp. 137-142.

Lavrenko, V., et al., "Relevance models for topic detection and tracking", in Proceedings of the HLT-2002, San Diego, CA 2002.

Schapire, R. E., et al., Boostexter: A boosting-based system for text categorization, in Machine Learning, 2000.

Yang, Y., et al., "A study on retrospective and on-line event detection", in Proceedings of SIGIR-98, Melbourne, Australia, 1998.

Yang, Y., et al., "Topic-conditioned novelty detection" in Proceedings of the International Conference on Knowledge Discovery and Data Mining, Edmonton, Canada, 2002.

Zhang, Y., et al., "Novelty and redundancy detection in adaptive filtering" in Proceedings of SIGIR-02, Tampere, Finland, 2002, pp. 81-88.

R. O. Duda, P.E. Hart and D. G. Stark, Pattern Classification, Second Edition, Jon Wiley & Sons Inc. New York, 2001, p. 630-633.

Ralf D. Brown, "Dynamic Stopwording for Story Link Detection", Language Technologies Institute Carnegie Mellon University, Proceedings of the HLT 2002: Second Conference on Human Language Technology Research, San Diego, CA Mar. 25, 2002.

* cited by examiner

FIG. 4

| STORY1 ID | STORY2 ID | SIMILARITY-METRIC | AVERAGE-STORY-SIMILARITY-ADJUSTMENT | SAME EVENT-SAME SOURCE ADJUSTMENT |
|---|---|---|---|---|
| 1000 | 1001 | .34 | .003 | .031 |
| . | . | . | . | . |
| 1001 | 1002 | .25 | .024 | .023 |

| STORY1 ID | STORY2 ID | SIMILARITY-METRIC | AVERAGE-STORY-SIMILARITY-ADJUSTMENT | SAME EVENT-SAME SOURCE ADJUSTMENT | ... | COSINE-DISTANCE-SIMILARITY-METRIC | AVERAGE-STORY-SIMILARITY-ADJUSTMENT-COSINE-DISTANCE | SAME EVENT-SAME SOURCE ADJUSTMENT-COSINE-DISTANCE |
|---|---|---|---|---|---|---|---|---|
| 1000 | 1001 | .34 | .003 | .031 | . | .33 | .002 | .030 |
| . | . | . | . | . | . | . | . | . |
| 1001 | 1002 | .25 | .024 | .023 | . | .24 | .023 | .022 |

710 / 720 / 731 / 741 / 751 / 732 / 742 / 752

800

SYSTEMS AND METHODS FOR NEW EVENT DETECTION

INCORPORATION BY REFERENCE

This Application incorporates by reference:
Entitled "SYSTEMS AND METHODS FOR DETERMINING THE TOPIC STRUCTURE OF A PORTION OF TEXT" by I. Tsochantaridis et al., filed Mar. 22, 2002 as U.S. patent application Ser. No. 10/103,053;
Entitled "SYSTEMS AND METHODS FOR LINKED EVENT DETECTION" by F. Chen et al., filed Jul. 25, 2003, as U.S. patent application Ser. No. 10/626,875; each, in their entirety.

BACKGROUND OF THE INVENTION

1. Field of Invention

This invention relates to the detection of new events.

2. Description of Related Art

New event detection systems determine whether a story event described in radio or television broadcasts, newspaper articles or other information sources differ sufficiently from previous stories to be categorized as a new event. New event detection systems differ from conventional categorization systems in that the events to be detected occur frequently but have not been seen before. Thus, effective new event detection systems must devise strategies for learning from new input or must determine ways of characterizing the input independent of the particular event.

Yang describes a conventional new event detection system that combines term frequency inverse-document frequency models with different clustering techniques for historical and look ahead data. See Yang et al., "A Study on Retrospective and On-Line Event Detection", in Proceedings of SIGIR-9, Melbourne, Australia, 1998. Zhang describes document classification by broad topic categories and topic-based new event detection based on topic conditioned stop words and weighting. See Zhang et al., "Novelty and Redundancy Detection in Adaptive Filtering", in Proceedings of SIGIR-02, Tampere, Finland, 2002, p. 81-88.

Allan describes a conventional system event detection system using incremental term frequency inverse document frequency models, single link measures, topic based models and relevance models. See Allan et al., "On-Line New Event Detection and Tracking", Proceedings of the SIGIR-98, Melbourne, Australia, 1998, p. 37-45. Franz describes the use of temporal features such as cluster recency to improve new event detection. See www.itl.nist.gov/iaui/894.01/tests/tdt/tdt2001/PaperPres/ibm-pres/tdt2001_nn.ppt, as downloaded Jul. 24, 2004.

SUMMARY OF THE INVENTION

The systems and methods according to this invention provide for determining source-identified incremental and non-incremental term frequency inverse story frequency models, determining term frequency-inverse event frequency models, determining adjustments based on story characteristics such as average story similarity and same event-same source. Systems and methods for optional segmentation are also provided. New events are determined based on inter-story similarity metrics, story characteristic adjustments and an optional threshold similarity value.

BRIEF DESCRIPTION OF THE DRAWINGS

FIG. 4 is a first exemplary data structure for storing adjustment information according to this invention;
FIG. 5 is a second exemplary data structure for storing adjustment information according to this invention.

DETAILED DESCRIPTION OF EXEMPLARY EMBODIMENTS

Figure 1:
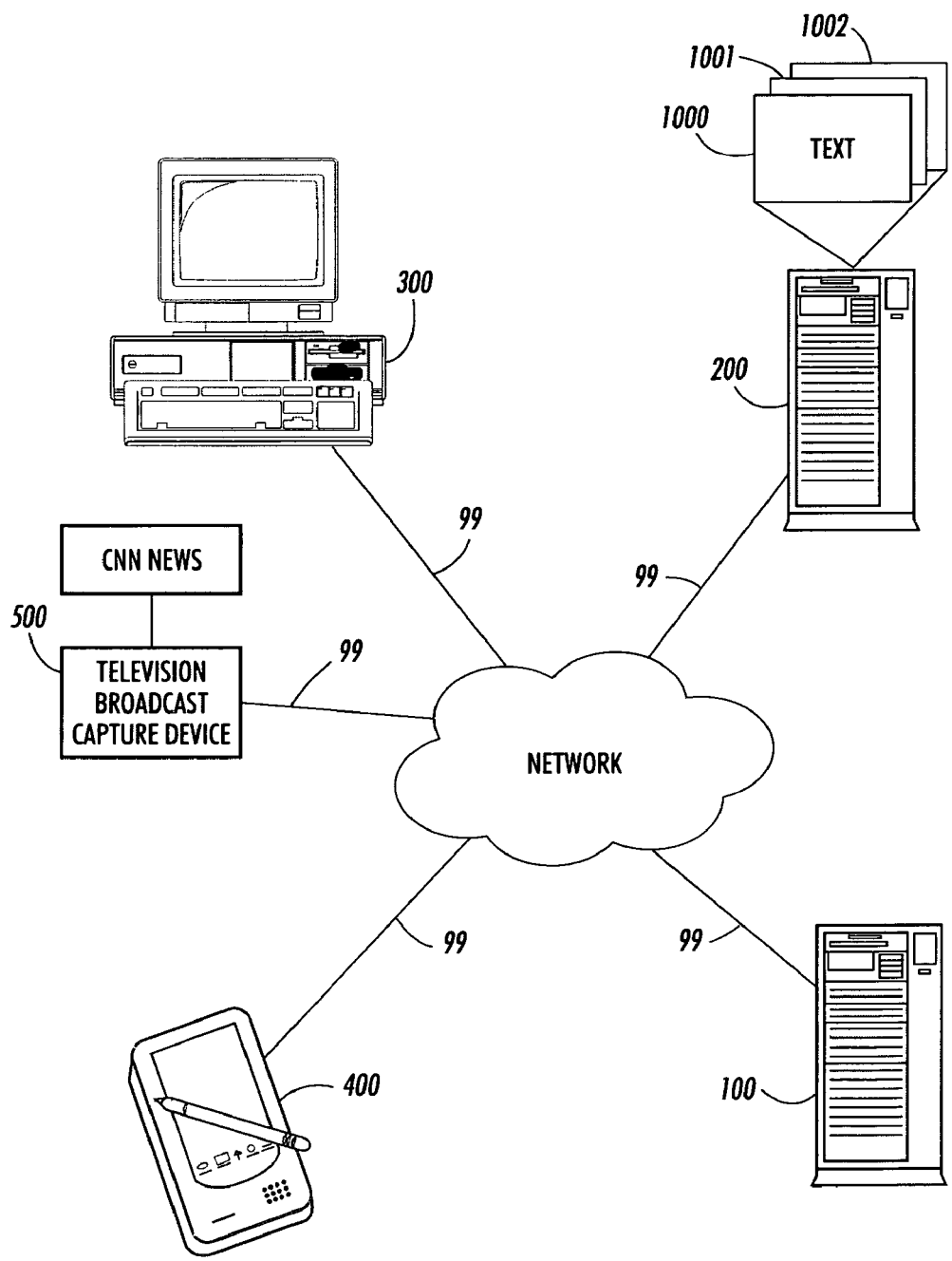
FIG. 1 is an overview of one embodiment of an exemplary new event detection system according to this invention.

FIG. 1 is an overview of one embodiment of an exemplary new event detection system 100 according to this invention. The new event detection system 100 is connected via the communication links 99 to a personal computer 300, a web-enabled tablet computer 400, a television broadcast capture device 500 and an information repository 200 containing source-identified stories 1000-1002.

In one of the various exemplary embodiments according to this invention, a user of the personal computer 300 initiates a new event detection request to determine whether a new story 1002 is about a new event or about an old event.

New stories may include but are not limited to maintenance reports compiled by repair technicians, epidemiological reports compiled by medical staff or any other type of story. Thus, in one exemplary embodiment according to this invention, a product manufacturer places archival maintenance reports or stories a story corpus accessible via information repository 200. As technicians encounter maintenance problems, the problems are described in maintenance reports. The maintenance reports are then submitted to the new event detection system 100. The new event detection system 100 forms story pairs for the new story and each story in the story corpus. Inter-story similarity metrics are determined for each story pair. Adjustments to the inter-story similarity metrics are determined based on the story characteristics. Story characteristics include but are not limited to an average inter-story similarity characteristic, a rule of interpretation characteristic, a same event-same source characteristic, an authorship characteristic or any other known or later developed characteristic associated with a story.

A probability that the new story is a new event is determined by the new event detection system 100. If the new story is determined to be a new event, resources may be deployed to address the new problem. However, if the new story is linked via a shared event to stories in the source-identified story corpus, the linked stories are returned as potential solutions to the problem. Thus, new event detection system 100 allows solutions to be found more easily in the source-identified story corpus.

In an epidemiological environment, medical reports, newspaper stories, broadcast news items and other source-identified stories are placed in the story corpus served by the information repository 200. Story-pairs are formed for each new story and each story in the story corpus. Inter-story similarity metrics and story characteristic adjustments are determined.

A new event prediction is then determined based on the inter-story similarity metric and the story characteristic adjustments. For example, in one exemplary embodiment according to this invention, the new event detection system 100 predicts a new event for a story if story characteristic adjusted inter-story similarity scores exceed a previously determined threshold.

In the epidemiological environment described above, stories are associated with reported disease outbreaks. However, it will be apparent that any type of new event may be detected using the systems and methods of this invention. A predictive event model is used to determine the likelihood that a story is associated with a specific event. For example, a rule of interpretation may be applied to a story to determine a rule of interpretation or ROI category. An ROI is a categorization of events. In various exemplary embodiments, event categories may be determined based on manual labeling, or any known or later developed method of categorizing events. The source-identified story corpus reflects previously reported disease outbreaks from a wide variety of sources. Each disease report is associated with an ROI category.

Similar groups of people, genres, languages or other groupings identifiable by story characteristic are likely to use similar terms. Thus, for the story characteristic "epidemiology-genre" the associated terms "YEARLY DISEASE MORBIDITY REPORT" are helpful in differentiating between epidemiological reports and financial reports. These terms are not very helpful in differentiating among the epidemiological reports. However, term and/or inter-story similarity metric adjustments based on the "epidemiology-genre" story characteristic can improve the sensitivity of the inter-story similarity metric for stories associated with the story characteristic while ensuring the terms remain available for inter-genre comparisons. The story characteristic "epidemiological-genre" is used merely for illustrative purposes. Thus, it will be apparent that any known or later developed story characteristic, either alone or in combination, may also be used in the practice of this invention.

The new event detection request is then forwarded via communications links 99 to the new event detection system 100. The new event detection system 100 retrieves the story corpus 1000-1001 from information repository 200 over communications link 99. The new event detection system 100 may form a part of a stand-alone personal computer or may be located at any point accessible via communications link 99. Moreover, the story corpus 1000-1001 may be stored locally on disk, CD-ROM and/or may be placed at any location accessible via communication links 99.

The new event detection system 100 performs optional word stemming and/or other pre-processing of the new source-identified story and each of the stories in the source-identified story corpus 1000-1001. The new source-identified story 1002 is then optionally segmented based on a topic, a sliding segment window, tiling or any other segmentation method. Story pairs are formed with the new story 1002 and each of the stories in the story corpus 1000-1001. Stopwords are removed and the terms are determined.

Story characteristics may include direct characteristics associated with a story such as the original input language, the current language, story authorship and the like. Story characteristics may also be derived based on a ROI category of the story, average story similarity or any other known or later developed characteristic associated with a story.

The source-identified terms are then incorporated into the source-identified term-frequency-inverse story frequency models associated with a story characteristic. The terms for sets of stories may also be accumulated and incorporated into incremental source-identified term frequency-inverse story frequency models at specific update frequencies. For example, in one exemplary embodiment according to this invention, an update of the source-identified term-frequency-inverse-story-frequency models occurs every two hours or every thirty stories, whichever occurs first. In other exemplary embodiments according to this invention, the frequency of an update may be based on time-periods, number of stories encountered and/or any other criteria. The terms may also be include un-translated terms and/or terms in other characters sets. Part-of-speech tagging information may also be included to further differentiate terms.

Source-identified terms are also incorporated into the term-frequency-inverse event frequency models. In various exemplary embodiments according to this invention, terms appearing in a story and/or story segment and associated with an event are accumulated and incorporated into term frequency-inverse-event models. Term weights may also be adjusted based on any segments determined for the stories. The source-identified term frequency-inverse story frequency models and the event frequency models are then combined using term weights.

One or more similarity metrics for each story pair are determined. Story characteristics such as average story similarity; same event-same source, genre and/or author characteristics are used to determine adjustments to the inter-story similarity metrics for the story pairs. A new event score for the new story is determined based on the inter-story similarity metrics and adjustments associated with the new source-identified story. For example, in one of the various exemplary embodiments according to this invention, the determined similarity metrics for each story pair associated with the new source-identified story are dynamically and selectively adjusted based on one or more story characteristics relating to the new source-identified story and/or the corpus story. In one embodiment according to this invention, a new event prediction is indicated with a numeric prediction based on the inter-story similarity score and any adjustments. In various other embodiments, a new event indicator is returned for the new story if the adjusted similarity scores for the new story and the stories in the story corpus exceed a threshold.

It will be apparent that in various other exemplary embodiments according to this invention, a subset of the stories may be selected from the source-identified story corpus 1000-1001. For example, in one embodiment, the set of n-most similar stories to the new story are selected. The n-most similar stories then serve as a smaller story corpus from which story-pairs are determined. This reduces the processing time by reducing the number of stories for which adjustments are made.

In still other exemplary embodiments according to this invention, adjustments are determined and applied based on story characteristics such as author, genre and the like. In this way, a story author, story genre or any known or later developed story characteristic may be used to adjust the similarity metrics of a story pair.

In another exemplary new event detection environment, epidemiological or medical reports are written by a wide variety of authors. In some cases, doctors complete the medical report. In other cases, technicians and/or statisticians complete the medical reports. In one example, new event medical reports are associated with the outbreak of a new disease. New events associated with new disease outbreaks must be detected over old events reporting or re-reporting old or well-known disease outbreaks. New event detection in the epidemiological environment is difficult because each story about a disease outbreak is likely to contain similar terms.

However, the new event detection system 100 allows for determining dynamic and selective adjustments to the inter-story similarity metrics based on story characteristic based groupings to improve intra-group selectivity.

In various other exemplary embodiments according to this invention, a user of an input device such as web-enabled tablet computer 400 initiates a new event detection request for the new source-identified story 1002 and the source-identified story corpus 1000-1001. The new event detection request is forwarded over communications link 99 to the new event detection system 100. The new event detection system 100 receives the new event detection request and the stories 1000-1002. The new source-identified story 1002 is segmented and the terms are determined. The incremental source-identified term frequency-inverse story frequency models are updated with terms from the new source-identified story 1002. Terms for the events associated with the story are optionally determined and added to the term frequency inverse-event frequency models.

Inter-story similarity metrics and story characteristic based adjustments are determined for the new source-identified story 1002 and each story 1000-1001 in the source-identified story corpus. Thus, inter-story similarity metrics and story characteristic based adjustments are determined for story-pairs 1002-1000 and 1002-1001. The probability that the new source-identified story 1002 is about a new event is determined based on the inter-story similarity metrics and the associated story characteristic adjustments. For example, in one of the various exemplary embodiments according to this invention, new events are determined based on new event scores for the new story source-identified 1002 with respect to each story in the source-identified story corpus.

The new event score for the story reflects the probability the new story is about a new event. In other exemplary embodiments, a new event indicator is returned if the new event probability exceeds a determined threshold value. However, it should be apparent that any method of determining new events based on story characteristic adjustments and/or dynamically determined story characteristic based term weights may be used in the practice of this invention. The new event score and/or new event indicator are then returned to the user of web-enabled tablet computer 400 over communications link 99.

In various other exemplary embodiments according to this invention, a new story may be captured from the television broadcast capture device 500 using an automatic speech recognizer (not shown), captured from transcribed medical reports or entered using any other known or later developed input method.

Thus, in one example, the CNN news story, "Breaking NEWS, a severe tornado hits the Raleigh, N.C. area today" is captured by the television broadcast capture device 500. The speech utterances are automatically recognized and transcribed. The automatically recognized speech story is then forwarded to the information repository 200. Story pairs are formed from the story and each story in source-identified story corpus. Inter-story similarity metrics for each story pair are determined. Adjustments based on the one or more story characteristics are applied to the determined inter-story similarity metrics.

Figure 2A:
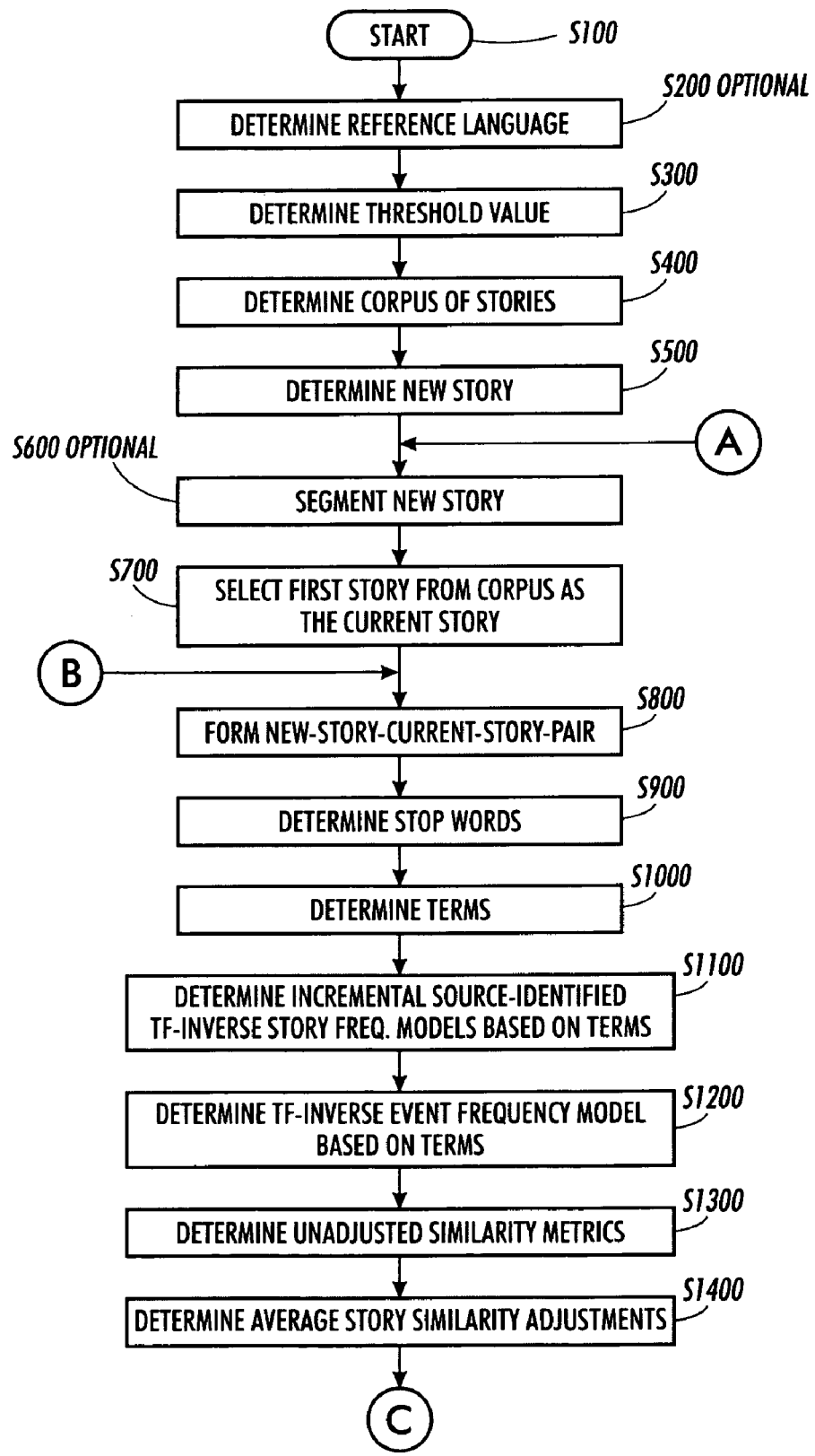
FIG. 2 is a flowchart of an exemplary method for new event detection according to this invention.
Figure 2B:
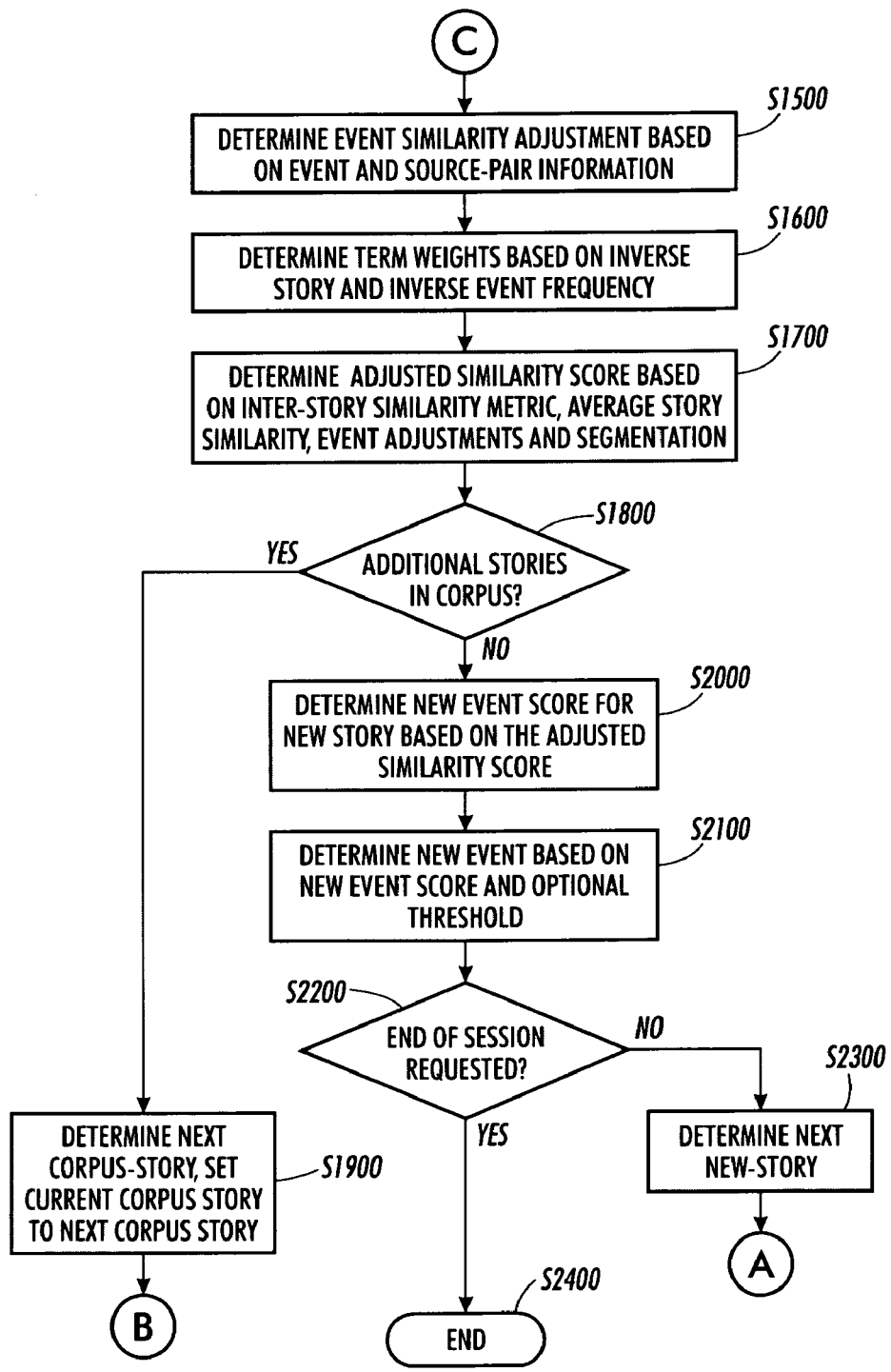

FIG. 2 is a flowchart of an exemplary method for new event detection according to this invention. The process begins at step S100 and immediately continues to step S200 where the optional reference language is determined. For example, in various embodiments according to this invention, the reference language is determined using a dialog box, a pop-up window and the like, determined automatically based on user information stored in a profile, retrieved from a memory or entered using any other known or later developed input method.

The reference language is selected to reflect the language of the user and/or an inter-lingual language for which translation tools exist. In various exemplary embodiments according to this invention, the input language is the original input language of the story and current language is the language the story has been translated to, if different from the input language. A user selects "English" as the reference language by selecting the "English" identified item in a drop down list of languages using a mouse click, speech selection or other input method. The initial reference language is typically determined at startup and then used for each successive story. After the reference language is determined, control continues to step S300.

The threshold value is determined in step S300. The threshold value reflects the degree of similarity or dissimilarity necessary to characterize a story as a new event. For example, if a new event is determined based on a dissimilarity measure such as (1-similarity(q,d)) then computed scores above the threshold value indicate a new event and computed scores below the threshold value indicate linked events. Conversely, if a new event is determined based on a similarity measure such as similarity(q,d), computed scores below the threshold value indicate new events and computed scores above the threshold value indicate linked events. The threshold value may be entered by a user during a new event detection session, determined dynamically, or retrieved from a memory. For example, in various exemplary embodiments, the threshold value is retrieved from a threshold value memory, determined based on the optimal value from previous runs or any other known or later developed method. After the threshold value is determined, control continues to step S400.

A source-identified story corpus is determined in step S400. The source-identified story corpus reflects stories already in the system. The source-identified story corpus reflects the group of stories to which each new story is compared to during new event detection. The source-identified story corpus is contained in a web-server serving HTML and/or XML files, a digital library or any known or later developed information repository. The source-identified story corpus may include a large variety of sources. For example, stories from electronic newspaper articles, paper based newspaper articles, captured speech, electronic maintenance reports, epidemiological reports and the like may all be added to the source-identified story corpus. After the source-identified story corpus has been determined, control continues to step S500.

In step S500, a new source-identified story is determined. As discussed above, the new source-identified story is received from electronic newspaper articles, captured speech or any other information source. After the new source-identified story is determined, control continues to optional step S600.

The new source-identified story is optionally segmented in step S600. Segmenting a story facilitates inter-story topic comparisons. That is, story segmentation allows sub-topics within stories to be compared. If optional segmentation is applied to a new-story, then the optional segmentation is also applied to the other stories in the story corpus. The new source-identified story can be segmented based on topic, as described in co-pending, co-assigned U.S. patent application Ser. No. 10/105,053 to Tsochantaridis et al. In various other embodiments, a sliding window or tiling approach, as further described in M. A. Hearst, "TextTiling: Segmenting Text into Multi-paragraph Subtopic Passages", Computational Linguistics, 23(1):33-64, 1997 may be used. However, it will be apparent that any known or later developed method of story segmentation may be used in the practice of this invention. Control then continues to step S700.

In step S700, a current story from the source-identified story corpus is selected as the current corpus story. For example, a first story in the source-identified story corpus is selected. Successive selections continue selecting from the source-identified story corpus until each corpus story has been selected once. After the current story is selected, control then continues to step S800.

In step S800, a story-pair is formed from the new story and the current corpus story. The story pair forms a basis for comparing stories. Inter-story similarity metrics are determined indicating the degree of similarity between the first and second stories in the story pair. After the story-pair is determined, control continues to step S900.

Stopwords in the new story are determined and removed in step S900. In various exemplary embodiments according to this invention, the stopword list includes frequently occurring words such as "and", "a", "the" and other high frequency words that add little meaning. After the stopwords are discarded and/or removed, control continues to step S1000.

In step S1000, all terms except the stopwords are selected. Optionally, terms having low story counts are discarded. The selected terms are incorporated into incremental and/or non-incremental source-identified term frequency-inverse story frequency models and/or term frequency models based on story characteristics such as ROI category, event, source, genre and the like. Selected terms include, but are not limited to non-stopwords and un-translated or non-reference language terms. For example, due to translation limitations, a complete translation of all terms in a story may not be possible. That is, some terms and/or context information associated with the term may be difficult or impossible to translate. Automatic translation systems or human translators may leave terms un-translated, tagged with HTML, XML tags, left in the original encoding such as Unicode, ASCII and the like, or otherwise indicated. Parts of speech tags may also be added to further differentiate the terms.

The use of event frequency and other story characteristic based frequency models allow the importance of un-translated terms to be weighted within specified groupings based on the story characteristics. The significance of these un-translated terms may then be used to further differentiate stories. After translated and un-translated terms are selected, control continues to step S1100.

In step S1100, incremental source-identified term frequency-inverse story frequency models are updated and non-incremental source-identified term frequency-inverse story frequency models identified and used. That is in various embodiments according to this invention, source-identified term frequency-inverse story frequency analysis is performed incrementally as sets of source-identified stories are added to the source-identified story corpus. In this way, the models are refined as new stories are received.

As each set of new stories is analyzed, new vectors associated with the new terms are added to the incremental source-identified term frequency-inverse story frequency models. In various exemplary embodiments according to this invention, incremental source-identified term frequency-inverse story frequency models are determined based on the formula:

$$df_k(t) = df_{k-1}(t) + df_{c_k}(t) \tag{1}$$

where $df_{c_k}(t)$ is the number of stories in which term t occurs in the added set of new stories $C_k$ and $df_k(t)$ is the number of stories in which term t occurs, after adding the set of new stories $C_k$. The initial story counts $df_0(t)$ can be initialized from an empty training set, initialized based on historical information or other initialization method. An optional threshold value is set so that terms having story frequencies below the threshold value are removed from immediate consideration but may be kept for update with the next set of new stories $C_{k+1}$. Control then continues to step S1200.

In step S1200, the term frequency-inverse event frequency models are determined. For example, in one exemplary embodiment, event frequencies for terms are determined based on the formula:

$$ef_{r\,max}(t) = \max_{r \in R}(ef(r, t)) \tag{2}$$

where r is an ROI category, R is the set of all possible ROIs, ef(rt) is the frequency of the term t in ROI category r.

The exemplary inverse event frequency may be determined based on the formula:

$$IEF(t) = \log\left[\frac{N_{e,r\,max}}{ef_{r\,max}(t)}\right] \tag{3}$$

where $N_{e,rmax}$ is the number of events in ROI rmax. However, if there are enough ROI labeled stories, the inverse event frequency IEF(t) may alternatively be computed based on a weighted event score from the formula.

$$IEF'(t) = \sum_{r \in R} P(r)\log\left[\frac{N_{e,r}}{ef(r, t)}\right] \tag{4}$$

where r is an ROI category.

The ROI categorizations are obtained from ROI labeled events, determined from a predictive model or any other known or later developed method of ROI classification. Term frequency-inverse event frequency models are then determined based on the event frequency information. Control continues to step S1300.

In step S1300, one or more unadjusted inter-story similarity metrics are determined for the new story and the current corpus story. The determined inter-story similarity metrics may include but are not limited to the Hellinger, cosine-distance, clarity, Tanimoto, KL divergence or any other known or later developed similarity metric.

In one of the various exemplary embodiments according to this invention, a cosine-distance similarity metric describing the similarity between new story q and current corpus d is determined based on the formula:

$$\text{similarity}(q, d) = \sum_t w(q, t) \cdot w(d, t) \tag{5}$$

Where t ranges over the terms that occur in stories q and d, and w reflects the term weights as further describes in equation (12).

The cosine-distance similarity metric is then adjusted based on a story characteristic. For example, the average story similarity of the new story to each story in the source-identified story corpus may be determined. However, it will be apparent that any other known or later developed story characteristic, including but not limited to, same event-same source, genre and author may also be used. The cosine-distance similarity metric is then adjusted. The adjusted cosine-distance similarity metric dynamically compensates for shared terms by dynamically adjusting the importance of the terms based on the story characteristics.

In still other exemplary embodiments according to this invention, an average cosine-distance inter-story similarity metric between the current corpus story d and each story in the story corpus is determined. A symmetrically adjusted cosine-distance inter-story similarity metric is determined based on the cosine-distance similarity metric and a symmetric average story similarity adjustment. The adjusted symmetric cosine-distance inter-story similarity metric compensates for the broadness of coverage of either the new story or the current corpus story. Story characteristics such as same event, same source, writer, genre and the like can also be used to adjust the inter-story similarity metrics for story pairs. The story characteristic based adjustments improve the sensitivity of the similarity metric based on the groups identified by the story characteristics.

In various other exemplary embodiments according to this invention, optional weighted combinations of the inter-story similarity metrics are determined as follows:

$$\text{similarity}'(q,d) = P(\text{sameROI}(q,d)) * \text{similarity}_{IEF''}(q,d) + (1-P(\text{sameROI}(q,d)))(*\text{similarity}_{IEF''}(q,d) \quad (6)$$

where $P(\text{sameROI}(q,d))$ is the probability of q and d having the same ROI category and $\text{similarity}_{IEF''}$ is the similarity computed with IEF=1. That is, there is no influence from inverse event frequency.

It will be apparent that the optional weighted combination of the inter-story similarity metrics may also be used in link detection systems such as the co-pending, co-assigned U.S. patent application to Chen et al., Ser. No. 10/626,875, entitled "SYSTEMS AND METHODS FOR LINKED EVENT DETECTION".

The probability, $P(\text{sameROI}(q,d))$ can be computed from a training set labeled by ROI, assuming a normal distribution. The parameters of a normal distribution (mean and variance) are computed over the similarity of labeled pairs, for one corpus of pairs with the same ROI and a second corpus with different ROIs.

An exemplary probability of being in the same ROI is computed based on the ratio:

$$P(\text{sameROI}(q,d)) = \frac{N_{same}(\text{similarity}_{IEF''}(q,d))}{N_{same}(\text{similarity}_{IEF''}(q,d)) + N_{different}(\text{similarity}_{IEF''}(q,d))} \quad (7)$$

where $N_{same}(\text{similarity}_{IEF''}(q,d))$ and $N_{different}(\text{similarity}_{IEF''}(q,d))$ are the density of the normal distribution at the non-event weighted similarity of the two stories using the sameROI and the differentROI parameters respectively.

Broad coverage stories tend to cover a larger number of events while more focused stories tends to contain fewer events. To compensate for these differences in coverage, stories are selected based on story characteristics. Adjustments to the inter-story similarity metrics for the selected stories are then determined. The story characteristic based adjustments to the inter-story similarity metrics may be used to increase the sensitivity of the inter-story similarity metrics by dynamically adjusting values based on story groupings. This improves the ability to detect new events.

The Hellinger distance similarity metric is associated with the distance between word distributions for new story q and current corpus story d. The Hellinger distance similarity metric according to one embodiment of this invention is determined based on the formula:

$$\text{similarity}(q,d) = \sum_t \sqrt{w(q,t) \cdot w(d,t)} \quad (8)$$

The Hellinger similarity metric is adjusted based on average story similarity, same event-same source or any other story characteristic.

In step S1400, average story similarity adjustments are determined. Broad topic stories are likely to include a large number of events. In contrast, narrow topic stories are likely to contain fewer events. Thus, the high similarity of a broad topic story to other stories is not necessarily the same as a high similarity between a narrow topic story and some other story. The exemplary average story similarity adjustment captures this difference. The average story similarity adjustment is based on the difference of the average similarity of the new story to every other story in the story corpus.

It will be apparent that a story characteristic adjustment may be based on any type of direct or indirect story characteristic. Direct story characteristics include the input language of a story, the word length of a story or any other known or later developed characteristic. Indirect story characteristics defining relationships between stories may also be used. Thus, in one exemplary embodiment according to this invention, indirect story characteristics based on the average similarity of a story to every corpus story are used. Various other exemplary indirect story characteristics are based on the events associated with the story and/or the source associated with the story. Each of the direct and indirect story characteristics may be used, either alone or in combination to determine story characteristic based adjustments.

For example, in one exemplary embodiment according to this invention, the new-story is compared to all the other stories in the corpus using Hellinger and/or cosine-distance similarity metrics. The average of the resultant similarity metric for all stories in the corpus of stories is then used to determine the asymmetric story similarity adjustment story_adjustment(q,d), based on the formula:

$$\text{story\_adjustment}(q,d) = \overline{\text{similarity}}(q) \quad (9)$$

where $\overline{\text{similarity}}(q)$ is the average similarity of the new story q, to every other story in the story corpus.

In various other exemplary embodiments according to this invention, the average similarity metrics for each of the current corpus stories is maintained and used to determine a symmetric story similarity adjustment based on the formula:

$$\text{story\_adjustment}'(q,d) = \overline{\text{similarity}}(q) + \overline{\text{similarity}}(d) \quad (10)$$

where $\overline{\text{similarity}}(d)$, is the average similarity of the corpus story, to every other story in the corpus. After the story similarity adjustments are determined, control continues to step S1500.

In step S1500, adjustments based on the same event-same source characteristic are determined for each of the similarity metrics associated with the story-pair. The same event-same source adjustments are determined based on the event and source-pair information. That is, stories describing the same event and originating from the same source tend to use similar language. Thus, two stories originating from the "CNN" source tend to use similar language when describing the same event. Same event-same source adjustments are used to dynamically and selectively change the importance of terms used to determine a similarity metric to compensate for these shared terms and vocabularies.

In one of the various exemplary embodiments according to this invention, the same event-same source adjustment, event_adjustment(q,d) is determined based on the average similarity E, of stories that are about the same event and that originate from the same sources s(q) and s(d) from which stories q and d are drawn. Exemplary same event-same source adjustments may be determined based on the formula:

$$\text{event\_adjustment}(q,d) = E_{s(q),s(d)} \quad (11)$$

The descriptions of the average story similarity adjustments and same event-same source adjustments are merely exemplary. Thus, it will be apparent that any known or later developed story characteristics, either alone or in combination may also be used to adjust similarity metrics and/or term weights according to this invention. Moreover, the average story similarity adjustment, the same event-same source adjustment or any other story characteristic based adjustment may be applied in any order without departing from the scope of this invention. After the same source-same event adjustments are determined, control continues to step S1600.

In step S1600, the term weights are determined based on the frequency of occurrence of the terms in the stories and the story characteristic based frequency models. For example, in various exemplary embodiments according to this invention, the term weights are determined based on term frequency-inverse-story-frequency and term-frequency-inverse-event-frequency information.

The term weights of the selected terms t in story d are determined based on the formula:

$$w_k(d,t) = \frac{1}{Z'_k(d)} f(d,t) \cdot \log \frac{N_k}{df_k(t)} \cdot g(IEF(t)) \quad (12)$$

where f(d,t) is the number of times term t occurs in story d, $N_k$ is the number of stories at time k, IEF(t) is the number of events in ROI r that maximize equation (2), g is a scaling function and $Z'_k(d)$ is a normalization value.

An exemplary scaling function g, is determined based on the formula:

$$g(x) = (x-A)\frac{D-C}{B-A} + C \quad (13)$$

where A=$\min_t$IEF(t), and B=$\max_t$IEF(t). The term C can be used to specify the maximum adjustment of event-unspecific terms. Similarly, changes to D specify maximum event-specific terms. For linear scaling, default values of 0.8 and 1.0 for the C and D term work well. However, it should be apparent that other scaling functions that adjust the weights of event-specific and/or the event-unspecific terms may also be used in this invention.

In various exemplary embodiments according to this invention, normalization values $Z'_k(d)$ for the Hellinger, Tanimoto and other probabilistic metrics are determined based on the formula:

$$Z'_k(d) = \sum_t f(d,t) \cdot \log \frac{N_k}{df_k(t)} \cdot g(IEF(t)) \quad (14)$$

Similarly, exemplary normalization values $Z'_k(d)$ for the cosine distance and other Euclidean metrics are determined based on the formula:

$$Z'_k(d) = \sqrt{\sum_k \left[ f(d,t) \cdot \log \frac{N_k}{df_k(t)} \cdot g(IEF(t)) \right]^2} \quad (15)$$

After the term weights are determined, control then continues to step S1700.

In step S1700, an adjusted similarity score for the story-pair is determined based on the inter-story similarity metrics, the term weights the average story similarity adjustments, the same event-same source adjustments and/or any other story characteristic adjustments associated with the stories. For example, an adjusted similarity score may be determined based on the formula:

$$\text{adjusted\_similarity}(q,d) = \text{similarity}(q,d) - \text{story\_adjustment}(q,d) - \text{event\_adjustment}(q,d) \quad (16)$$

If segmentation has been applied to the stories, segments in each story are compared to the segments in every other story. In various exemplary embodiments according to this invention, the maximally similar segment pairs may be used as proxies for the story pair. For example, a maximum segment pair may be determined based on the following formula:

$$\text{seqment\_similarity}(q,d) = \max_{s_1 \in q, s_2 \in d} (\text{similarity}(s_1, s_2)) \quad (17)$$

where $s_1$ and $s_2$ are segments of stories q and d respectively. After the similarity score has been adjusted, control continues to step S1800.

In step S1800, a determination is made whether additional stories in the story corpus remain to be processed. If it is determined that there are additional stories to be processed, control continues to step S1900 where the next-corpus story is determined and set as the current corpus story. Control jumps immediately to step S800. Steps S800-S1900 are then repeated until it is determined that no additional corpus stories remain to be processed. Control then continues to step S2000.

In step S2000, a new event score is determined for the new story based on the adjusted similarity score for the new story, the other stories in the story corpus and the story characteristic based adjustments. Control then continues to step S2100.

In step S2100 a new event indicator is determined based on the new event score and the optional threshold value. For example, in one of the various exemplary embodiments according to this invention, a new event indicator is determined based on the formula:

$$\text{new\_event}(q,d) = (1 - \text{adjusted\_similarity}(q,d)) \quad (18)$$

If the new event score exceeds the optional threshold value, a new story indicator such as a probability or binary indicator is returned. Control then continues to step S2200.

A determination is made in step S2200 whether an end-of-session has been requested. The user may request an end-of-session by selecting a keyboard key, through voice command or any other input method. An end-of-session can also be triggered when the end-of-file is encountered in an input file. If no end-of-session has been signaled, control continues to step S2300, otherwise control continues to step S2400.

If a determination is made that no end-of-session has been requested, control continues to step 2300 where the next new story is determined. After the next new story is determined, control jumps immediately to step S600. Steps S600-S2300 are repeated until it is determined that an end-of-session has been requested. Control then continues to step S2400 and the process ends.

It should be apparent that the above description is merely illustrative. In various other exemplary embodiments according to this invention, any one of the steps S1200 and S1400-1700 may be used either alone or in combination in the practice of this invention.

Figure 3:
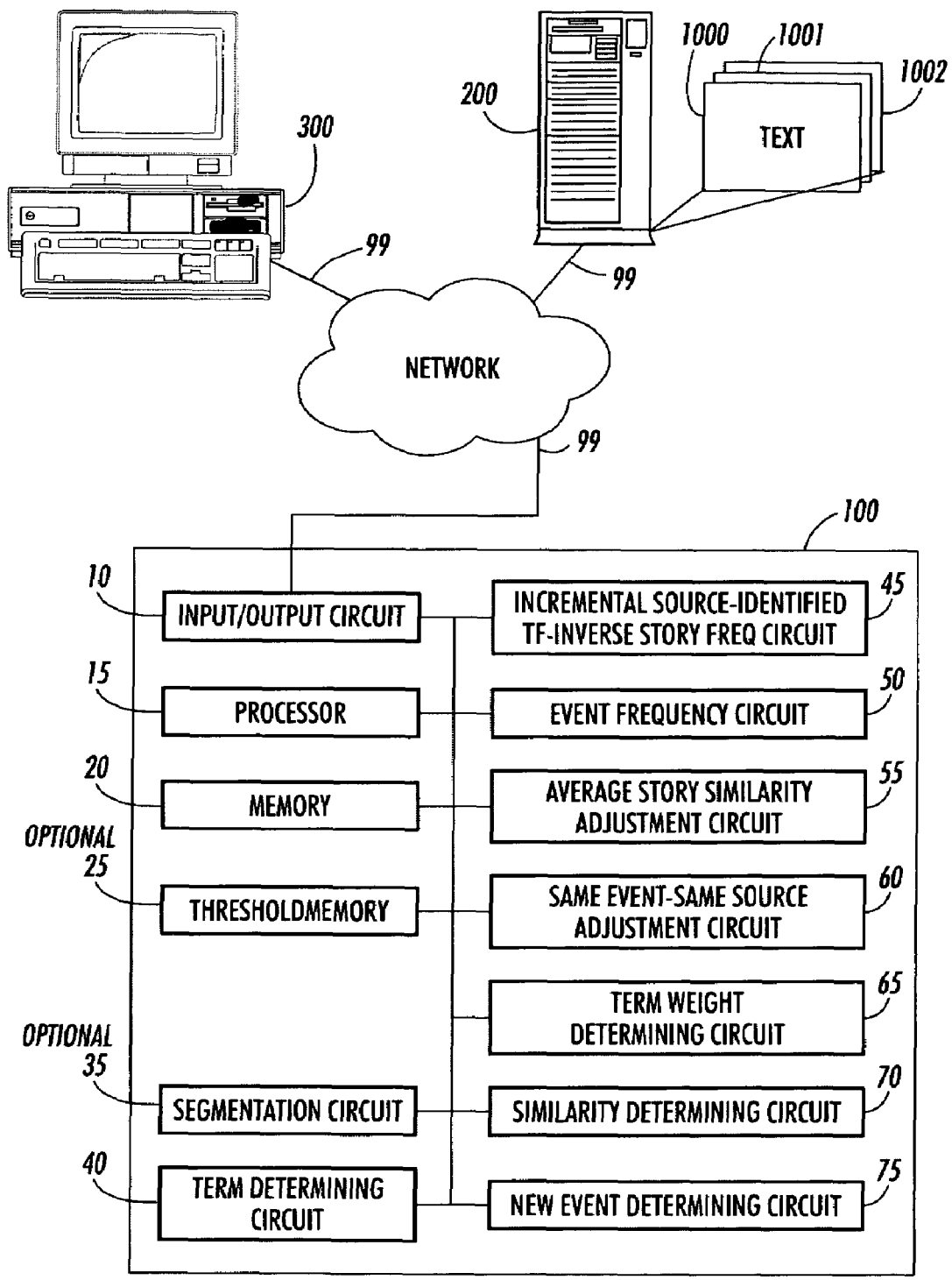
FIG. 3 is an exemplary new event detection system according to this invention.

FIG. 3 is an exemplary embodiment of a new event detection system 100 according to this invention. The new event detection system 100 is comprised of a processor 15, a memory 20, an optional threshold memory 25, an optional segmentation circuit 35, a term determining circuit 40, a source-identified term frequency-inverse story frequency circuit 45, an event frequency circuit 50, an average story similarity adjustment circuit 55, a same event-same source adjustment circuit 60, a term weight determining circuit 65, a similarity determining circuit 70 and a new event determining circuit 75, each connected via input/output 10 to communications link 99 and to the internet enabled personal computer 300 and the information repository 200. The information repository 200 contains a story corpus 1000-1001 and new story 1002. Each story in the story corpus 1000-1001 is associated with at least one event.

In one of the exemplary embodiments according to this invention, the user of personal computer 300 initiates a new event detection request. The new event detection request is forwarded over communications link 99 to the new event detection system 100. The new event detection request is received by the new event detection system 100. The processor 15 activates the input/output circuit 10 to retrieve the source-identified stories 1000-1002 over communications link 99 and stores the source-identified stories 1000-1002 in memory 20.

Optional stopword removal, word stemming and other processing operations are performed on the source-identified stories 1000-1002 by the processor 15. For example, a predetermined reference language selection is retrieved from memory 20 and/or dynamically determined. Retrieved stories that are not in the reference language are optionally translated to the reference language.

The processor 15 optionally activates the segmentation circuit 35 to segment the stories in memory 20. The stories may be segmented based on topic, sliding window or any other segmentation method. In various exemplary embodiments according to this invention, maximally similar segments between stories in a story pair are determined and used as proxies for the stories.

The term determining circuit 40 is activated to select terms to be included in further processing. Stopwords and/or terms having low story counts are removed from consideration. In various other exemplary embodiments, un-translated terms are also selected. Parts of speech tag information is optionally added to the term information. If the stories have been segmented, the term determining circuit 40 determines terms based on the story segments. Terms from the maximally similar story pair segments are selected.

The processor 15 activates the incremental source-identified term frequency-inverse story frequency circuit 45. The incremental source-identified term frequency-inverse story frequency circuit 45 determines models based on the determined terms. The event frequency circuit 50 is then activated to determine term frequency inverse event frequency models based on the terms.

The average story similarity adjustment circuit 55 is activated to determine adjustments based on the average value of a similarity metric for each source-identified corpus story and the new source-identified story. A symmetric average story similarity adjustment based on the comparison of each source-identified corpus story with respect to every other source-identified corpus story, may also be used.

The processor 15 activates the same event-same source adjustment circuit 60. The same event-same source adjustment circuit 60 determines stories associated with the same event and the same source. Two stories describing the same rule of interpretation category are likely to share vocabulary. Two stories originating from the same source and describing the same event are even more likely to share vocabulary. In various exemplary embodiments according to this invention, adjustments are determined based on the average of the similarity metrics for each set of same event and same source stories. In this way, the effect of shared vocabulary terms is reduced.

For example, a first Washington Post Business Section story describes the introduction of company ABC's newest medical product. A second Washington Post Business Section story describes the introduction of company XYZ's newest medical product. These stories are likely to share a large number of vocabulary terms making differentiation difficult. However, if the two Washington Post sourced stories are determined to be from the same ROI, same event-same source adjustments are dynamically and selectively applied to differentiate the stories by reducing the effect of the shared vocabulary terms.

It will be apparent that the description of the use of the story characteristic adjustments based on the average story similarity characteristic and the same event-same source story characteristic is merely illustrative and not intended to be limiting. Any story characteristic based adjustments such as the genre, writer and the like may be used, either alone or in any combination, without departing from the scope of this invention.

The processor 15 activates the term weight determining circuit 65 to determine the weights for each term. The term frequency-inverse story frequency models and the event frequency models are combined based on the terms weights. The similarity determining circuit 70 is activated to determine the similarity between the new story and the corpus story in the story pair. The inter-story similarity metric may be a probabilistic, Euclidean, distance-based or any other known or later developed similarity metric.

The new event determining circuit 75 is activated with the threshold value, the inter-story similarity metric, and story characteristic based adjustments, the term weights and the inter-story similarity metric to determine new event scores. In various exemplary embodiments, a new story is associated with a new event if the new event scores for the story exceed the optional threshold value. If the new event scores exceed the optional threshold value, a new event signal is returned to the user of personal computer 300 over communication links 99. Otherwise, an old or linked event signal is returned.

FIG. 4 is a first exemplary data structure for storing adjustment information 700 according to this invention. The exemplary data structure for storing adjustment information is comprised of a first story id portion 710, a second story id portion 720, an inter-story similarity metric portion 730, an average story similarity adjustment portion 740 and a same event-same source adjustment portion 750.

The first and second story id portions 710-720 form a story pair. The first row of the exemplary data structure for storing similarity adjustment information 700 contains the values "1000" and "1001" in the first and second story id portions 710-720. This indicates the first row of the exemplary data structure for storing adjustment information relates to the "1000:1001" story pair.

The inter-story similarity metric portion 730 contains the value "0.34" reflecting the cosine-distance similarity between the story-pair "1000:1001". The inter-story similarity metric may be the cosine-distance similarity metric, the Hellinger similarity metric or other known or later developed inter-story similarity metrics.

The average story similarity characteristic adjustment portion 740 contains the value "0.033" reflects the degree of similarity between story "1000" and each of the other stories in the story. It will be apparent that a symmetric average story similarity characteristic adjustment which reflects the average story similarity between story "1001" and every other story in the story corpus may also be used without departing from the scope of this invention.

The same event-same source characteristic adjustment portion 750 contains the value "0.031". This reflects the average of the similarity metrics for stories associated with the same event and drawn from the same sources as stories "1000" and "1001". That is, the value of the same event-same source adjustment portion 750 reflects the average of all similarity metrics associated with the same event and which are drawn from the same sources. This grouping and dynamic adjustment allows the importance of shared terms to be selectively reduced. For example, for two stories drawn from the same source and describing the same event, terms are selectively adjusted in importance to increase the sensitivity of the similarity metric to terms distinguishing the two stories.

The last row of the first exemplary data structure for storing similarity adjustment information 700 contains the values "1001" and "1002" in the first and second story id portions 710-720. Thus, the last row relates to the "1001:1002" story pair. The inter-story similarity metric portion 730 indicating the inter-story similarity between the first and second stories in the "1001:1002" story pair. The average story similarity characteristic adjustment portion 740 contains the value "0.024" associated with the average inter-story similarity between story "1000" and each of the other stories in the story. The same event-same source characteristic adjustment portion 750 contains "0.023" indicating the adjustment associated with stories drawn from the same event and the same source as stories "1000" and "1002".

FIG. 5 is a second exemplary data structure for storing adjustment information 800 according to this invention. The exemplary data structure for storing adjustment information is comprised of a first story id portion 710; a second story id portion 720; a Hellinger similarity metric portion 731; a Hellinger metric average story similarity adjustment portion 741; a Hellinger metric same event-same source adjustment portion 751; a cosine-distance similarity metric portion 732; a cosine-distance metric average story similarity adjustment portion 742; and a cosine-distance metric same event-same source adjustment portion 752.

The first and second story id portions 710-720 form a story pair. The first row of the exemplary data structure for storing similarity adjustment information 700 contains the values "1000" and "100" in the first and second story identifier portions 710-720. Thus, the first row relates to the "1000:1001" story pair.

The Hellinger similarity metric portion 731 contains the value "0.34" reflecting a measure of the similarity between the "1000:1001" story pair. The Hellinger metric average story similarity adjustment portion 741 contains the value "0.033" reflecting the Hellinger similarity between story "1000" and each of the other stories in the corpus of stories. In various other exemplary embodiments according to this invention, a symmetric average story similarity adjustment is used which also reflects the average of the Hellinger similarity metrics between story "1001" and each of the other stories in the corpus.

The Hellinger metric same event-same source adjustment portion 751 contains the value "0.031" reflecting the event and source similarity statistics between the story "1000" and story "1001" as measured by the Hellinger metric. The value of the Hellinger metric same event-same source adjustment portion 751 reflects the average of the Hellinger similarity metrics associated with the same event and which are drawn from the same sources. Thus, in one of the exemplary embodiments according to this invention, the importance of the terms shared between two stories drawn from the same source and describing the same event are reduced in importance to increase the sensitivity of the inter-story similarity metric to non-shared terms.

The cosine-distance similarity metric portion 732 contains the value "0.33" reflecting the cosine-distance similarity between the "1000:1001" story pair. The cosine-distance metric average story similarity adjustment portion 742 contains the value "0.032" reflecting the average cosine-distance similarity between story "1000" and each of the other stories in the story corpus. In various other exemplary embodiments according to this invention, a symmetric average story similarity based adjustment is used. The symmetric average story similarity adjustment also reflects the average cosine-distance based story similarity between story "1001" and each of the other stories in the story corpus.

The cosine-distance metric same-event same source metric adjustment portion 752 contains the value "0.030" reflecting the same-event and same source based adjustment to the cosine-distance based similarity metric between story "1000" and story "1001". Thus, in one of the exemplary embodiments according to this invention, the importance of the shared terms between two stories drawn from the same source and describing the same event are reduced in importance. This increases the sensitivity of the cosine-distance metric.

The last row of the second exemplary data structure for storing similarity adjustment information 800 contains the values "1001" and "1002" in the first and second story id portions 710-720. Thus, the last row relates to the "1001:1002" story pair. The Hellinger similarity metric portion 731 contains "0.25" reflecting the similarity between the first and second stories in the "1001:1002" story pair. The Hellinger metric average story similarity adjustment portion 741 contains the value "0.024" reflecting the Hellinger similarity between story "1001" and each of the other stories in the corpus of stories. The Hellinger metric same event-same source adjustment portion 751 contains the value "0.023" reflecting the same event and same source similarity statistics adjustment.

The Cosine-Distance similarity metric portion 731 contains "0.24" reflecting the similarity between the first and second stories in the "1001:1002" story pair. The Cosine-Distance metric average story similarity adjustment portion 742 contains the value "0.023" reflecting the Cosine-Distance similarity between story "1001" and each of the other stories in the corpus of stories. The Cosine-Distance metric same event-same source adjustment portion 752 contains the value "0.022" reflecting the same event and same source similarity statistics adjustment.

Figure 6:
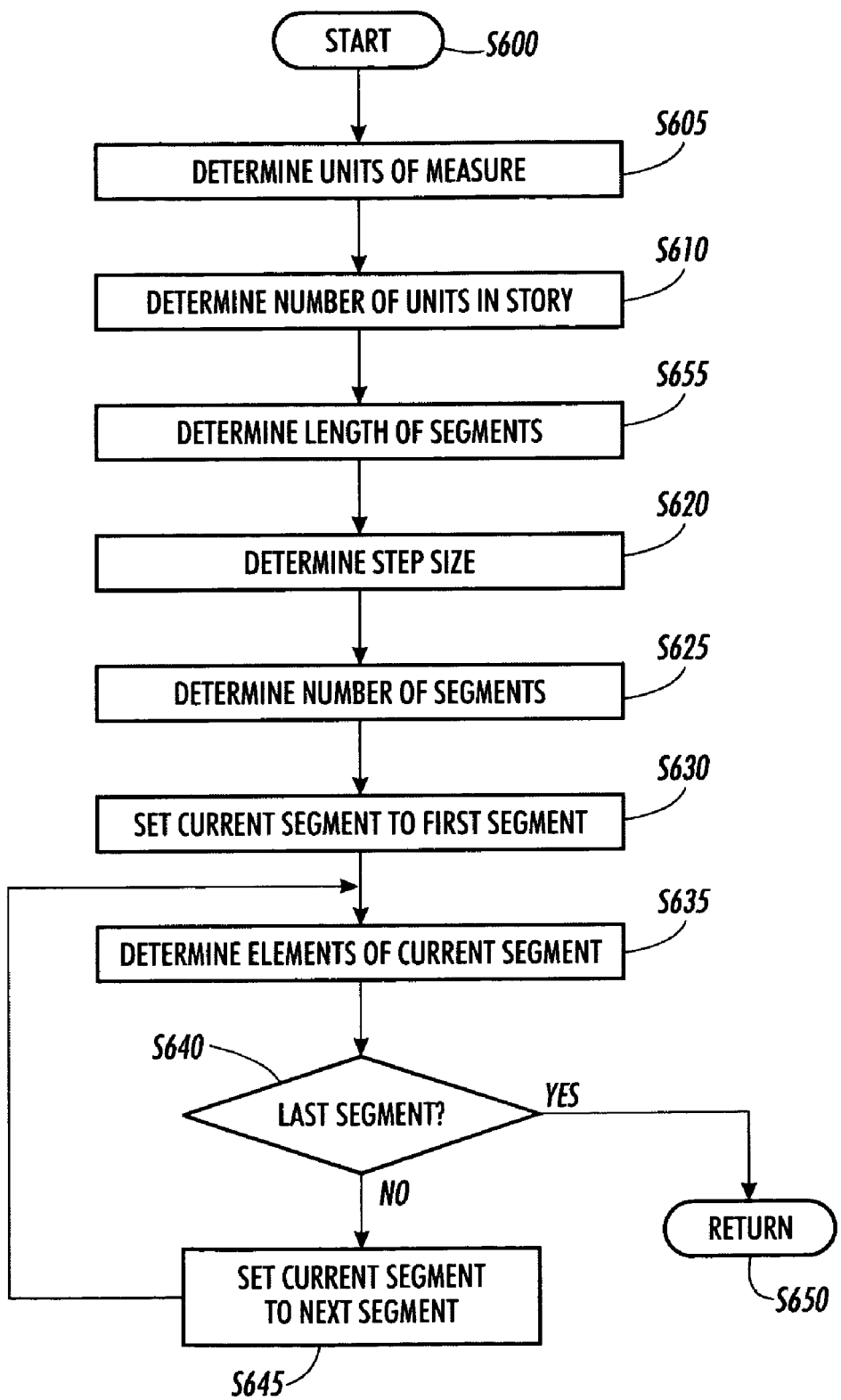
FIG. 6 is a flowchart of an exemplary method for segmenting stories according to this invention.

FIG. 6 is a flowchart of an exemplary method for segmenting stories according to this invention. The process begins at step S600 and immediately continues to step S605. In step S605, the measurement unit to be used in the segmentation process is determined. The measurement unit may be based on words, characters, sentences, paragraphs or any other unit of text associated with the story. In various exemplary embodiments, the measurement unit is determined dynamically, entered by the user and/or based on previously entered information. After the measurement unit is determined, control continues to step S610.

In step S610, the number of units contained in the story is determined. For example, if the measurement unit is one word, then the number of units in the story is the number of words in the story. If the measurement unit is a line or a paragraph, then the number of units in the story is the number of lines or paragraphs in the story. After the number of units in the story is determined, control continues to step S615.

In step S615, the length of the segments is determined. The length of the segments may be set by the user, retrieved from a memory or determined dynamically. For example, the length of the segment may be 40 words, 40 lines or any other length. After the length of the segments is determined, control continues to step S620.

In step S620, the step size is determined. The step size is related to the amount of overlap required between two adjacent segments. The step size may to range from a step size of 1 unit to a step size equal to the length of the segments. A step size of 1 unit reflects overlapping segments with one unit not shared between successive segments. Similarly, a step size equal to the length of the segment reflects no overlap between successive segments. The step size is entered by the user, set dynamically by the system, read from a memory or entered using any other input method. After the step size is determined, control continues to step S625.

In step S625, the number of segments is determined based on the length of the segment, the step size and the number of units in the story. After the number of segments is determined, control continues to step S630 where the current segment is set equal to the first segment. After setting the current segment, control continues to step S635.

The elements of the current segment are determined in step S635. For example, in one exemplary embodiment according to this invention, if the segment length is set to forty words, the first 40 words of the story are read into a first segment data structure. Control then continues to step S640.

In step S640, a determination is made whether the current segment in the story is the last segment. If the current segment is not the last segment, control continues to step S645 where the current segment is set equal to the next segment in the story. Control then jumps immediately to step S635. Steps S635-S640 are repeated until it is determined that the current segment is the last segment in the story. Control then continues to step S650 and the process returns.

Figure 7:
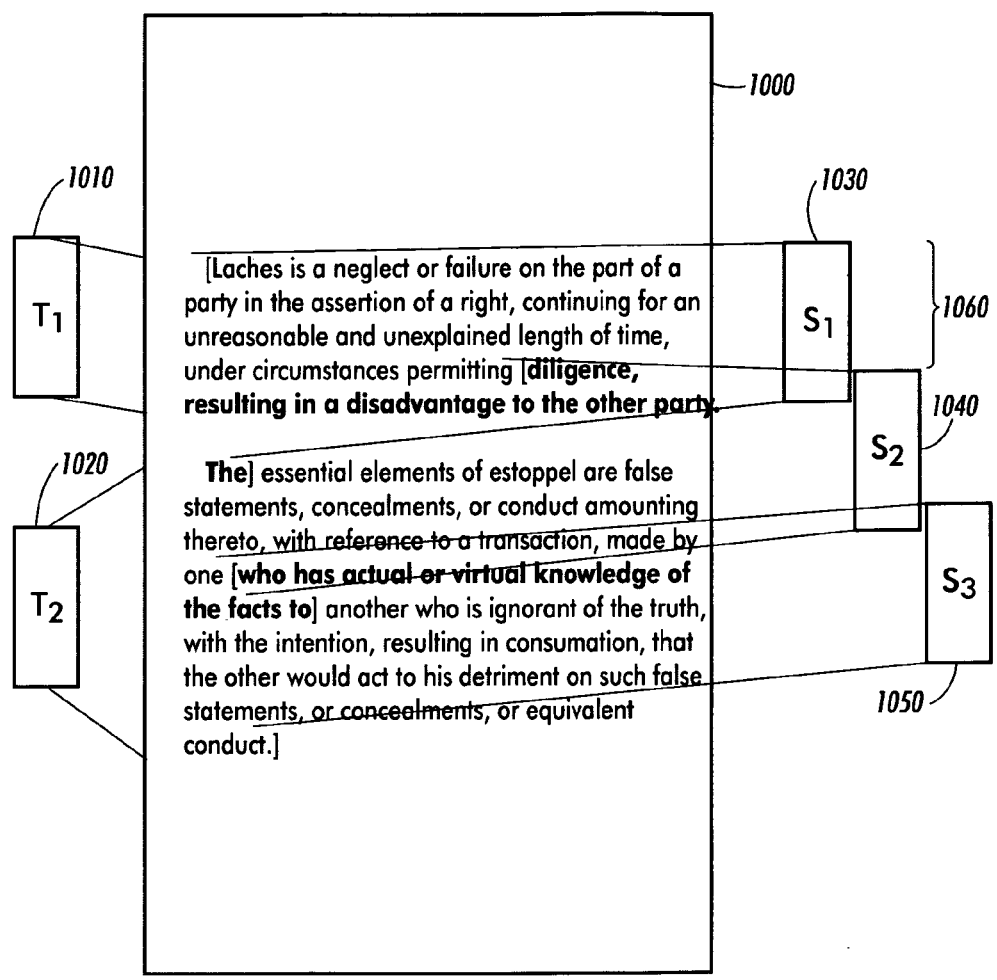
FIG. 7 is an exemplary story segmented according to this invention.

FIG. 7 is an exemplary story segmented according to this invention. In a first exemplary embodiment, the exemplary story is segmented into two topic segments $T_1$ 1010 and $T_2$ 1020. Topic $T_1$ 1010 describes the elements of the term "laches" and topic $T_2$ 1020 describes the elements of the term "estoppel". The topics may be segmented based on the methods described in Tsochantaridis et al., or using any known or later developed method of topic segmentation.

In a second exemplary embodiment, the story is shown having a first segment $S_1$ 1030 containing 40 words, a second segment $S_2$ 1040 containing 40 words and offset from the first segment $S_1$ 1030 by a step size 1060 of 30 words. First segment $S_1$ 1030 and second segment $S_2$ 1040 therefore overlap for 10 words as indicated by the text "diligence, resulting in a disadvantage to the other-party set in bold. The". A third segment $S_3$ 1050 is also offset by a step size 1060 of 30 words, resulting in an overlap of 10 words as shown by the text "who has actual or virtual knowledge of the facts to", set in bold.

In various embodiments according to this invention, the individual segments of each story are compared. In this way the individual topics and/or portions of the story as reflected in the segments are compared. This provides a finer granularity for comparison. The maximally similar story pair segments are selected as proxies for the respective story pairs.

Figure 8:
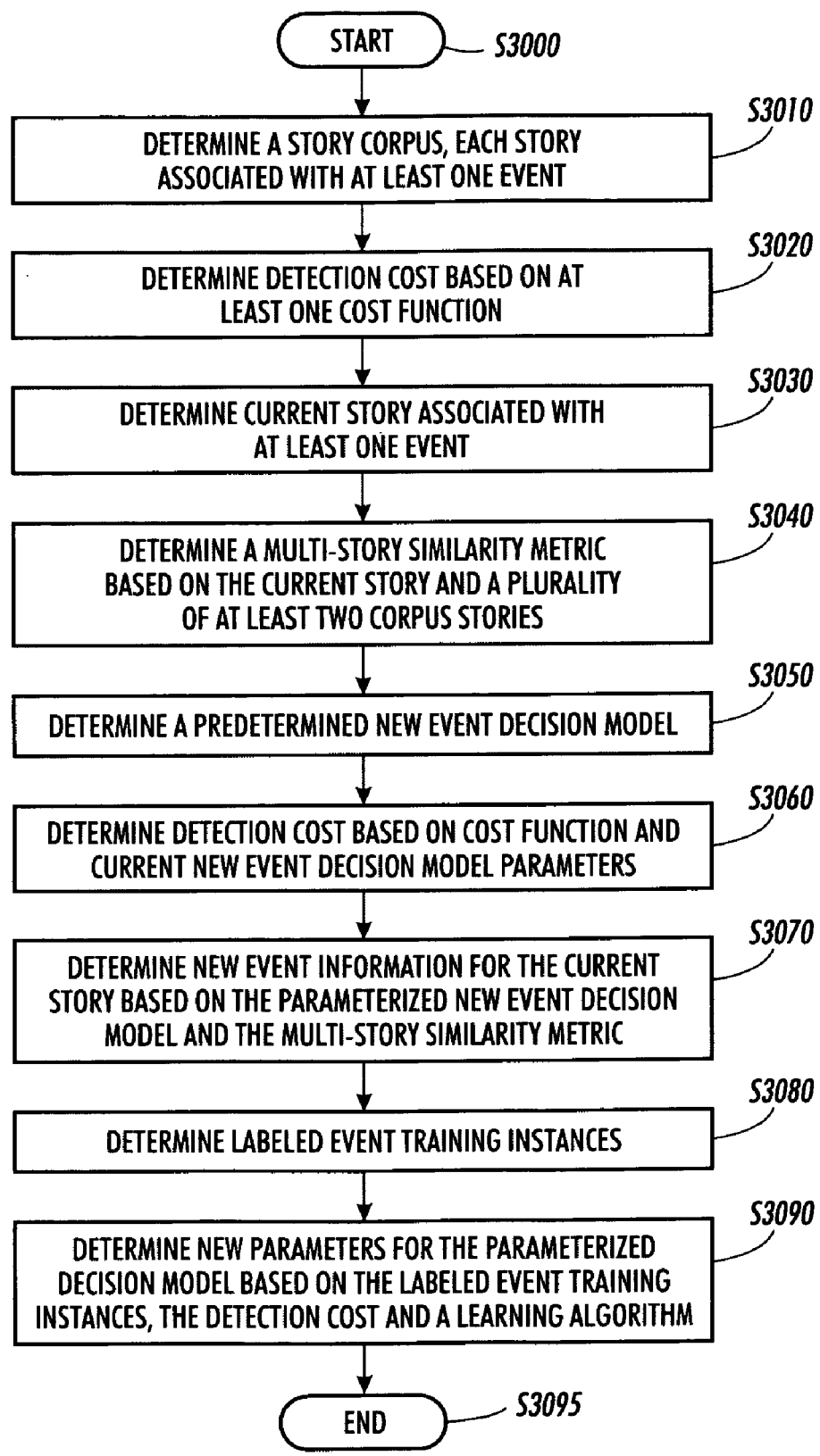
FIG. 8 is a flowchart of an exemplary method of selecting new event detection parameters according to this invention.

FIG. 8 is a flowchart of an exemplary method of selecting new event detection parameters according to this invention. The process begins at step S3000 and immediately continues to step S3010 where a story corpus is determined. Each story in the corpus is associated with at least one event. The story corpus may be an information repository, a digital library or any other source of stories. After the story corpus is determined, control continues to step S3020.

In step S3020, at least one cost function is determined. The cost function may be a user specified cost function or any combination of known or later developed cost functions. After the cost functions are determined, control continues to step S3030 where a current story is determined. The current story is associated with at least one event. The current story reflects the story about which the new event is to be determined. Control then continues to step S3040.

A multi-story similarity metric based on similarity information for at least two stories is determined in step S3040. That is, an inter-story similarity vector comprising similarity information for the current story and a plurality of at least two corpus stories is formed. Control then continues to step S3050.

In step S3050, a parameterized new event decision model is determined. The parameterized new event decision model is used to determine the new event status of the current story represented by the multi-story similarity metric. In various exemplary embodiments according to this invention, the parameterized new event decision model may be based on logistic regression or any other known or later developed parameterizable decision model useful in determining new events. Control then continues to step S3060.

A detection cost is determined based on any one or more of the determined cost functions. Control then continues to step S3070. In step S3070, the new event information for the current story based on the parameterized new event decision model and the multi-story similarity metric. Control then continues to step S3080.

In step S3080, labeled event training instances are determined. For example, stories associated with known events are labeled and the label information provided as label information. Once the label information is determined, control continues to step S3090.

New parameters for the parameterized decision model are determined based on the labeled event training instances, the determined detection cost and a learning algorithm that minimizes the cost function for the event labeled training instances. In various exemplary embodiments according to this invention, Powell's optimization algorithm is used as the learning algorithm. However, it will be apparent that any learning algorithm that provides for minimizing the cost for the event labeled training instances may be used in the practice of this invention. After the new parameters have been determined, control continues to step S3095 where the process ends. In various other embodiments according to this invention, the resultant parameterized detection model is used in detecting new events.

It will be apparent that the adjustment to the inter-story similarity metric may be determined directly through determined adjustments or indirectly by re-weighting of the various terms used to determine the inter-story similarity metrics without departing from the scope of this invention. As discussed above, it will also be apparent that various exemplary embodiments according to this invention may use optional weighted combinations of the inter-story similarity metrics. Moreover, the optional weighted combinations of inter-story similarity metrics may also be used in linked event detection.

Each of the circuits 10-75 of the new event detection 100 system described in FIG. 3 can be implemented as portions of a suitably programmed general-purpose computer. Alternatively, 10-75 of the new event detection system 100 outlined above can be implemented as physically distinct hardware circuits within an ASIC, or using a FPGA, a PDL, a PLA or a PAL, or using discrete logic elements or discrete circuit elements. The particular form each of the circuits 10-75 of the new event detection system 100 outlined above will take is a design choice and will be obvious and predicable to those skilled in the art.

Moreover, the new event detection system 100 and/or each of the various circuits discussed above can each be implemented as software routines, managers or objects executing on a programmed general purpose computer, a special purpose computer, a microprocessor or the like. In this case, new event detection system 100 and/or each of the various circuits discussed above can each be implemented as one or more routines embedded in the communications network, as a resource residing on a server, or the like. The new event detection system 100 and the various circuits discussed above can also be implemented by physically incorporating the new event detection system 100 into software and/or a hardware system, such as the hardware and software systems of a web server or a client device.

As shown in FIG. 3, memory 20 can be implemented using any appropriate combination of alterable, volatile or non-volatile memory or non-alterable, or fixed memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 99 shown in FIGS. 1 and 3 can each be any known or later developed device or system for connecting a communication device to the linked event detection system 100, including a direct cable connection, a connection over a wide area network or a local area network, a connection over an intranet, a connection over the Internet, or a connection over any other distributed processing network or system. In general, the communication links 99 can be any known or later developed connection system or structure usable to connect devices and facilitate communication Further, it should be appreciated that the communication links 99 can be wired or wireless links to a network. The network can be a local area network, a wide area network, an intranet, the Internet, or any other distributed processing and storage network.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A computer-implemented method of detecting new events comprising the steps of:

determining at least one story characteristic based on an average story similarity story characteristic and a same event-same source story characteristic;

determining a source-identified story corpus, each story associated with at least one event;

determining a source-identified new story associated with at least one event;

determining story-pairs based on the source-identified new-story and each story in the source-identified story corpus;

determining at least one inter-story similarity metric for the story-pairs; wherein the inter-story similarity metrics are comprised of at least one story frequency model and at least one story characteristic frequency model combined using terms weights; and wherein an event frequency is determined based on term t and rule of interpretation (ROI) category rmax from the formula:

$$ef_{rmax}(t) = \max_{r \in R}(ef(r, t))$$

wherein r is an ROI category, R is the set of all possible ROIs, ef(rt) is the frequency of term t in ROI category r:

determining at least one adjustment to the inter-story similarity metrics based on at least one story characteristic; and outputting a new story event indicator if the event associated with the new story is of a determined similarity or dissimilarity to the events associated with the source-identified story corpus based on the inter-similarity metrics and adjustments.

2. The method of claim 1, wherein the inter-story similarity metric is dynamically adjusted based on at least one of subtraction and division.

3. The method of claim 1, wherein the inter-story similarity metric is at least one of a probability based inter-story similarity metric and a Euclidean based inter-story similarity metric.

4. The method of claim 3, wherein the probability based inter-story similarity metric is at least one of a Hellinger, a Tanimoto, a KL divergence and a clarity distance based metric.

5. The method of claim 3, wherein the Euclidean based similarity metric is a cosine-distance based metric.

6. The method of claim 1, wherein the inter-story similarity metrics are determined based on a term frequency-inverse story frequency model.

7. The method of claim 1, wherein the inter-story similarity metrics are comprised of: at least one story frequency model; and at least one event frequency model combined using terms weights.

8. The method of claim 1, where the adjustments based on the story characteristics are applied to the term weights.

9. The method of claim 1, where the adjustments based on the story characteristics are applied to the inter-story similarity metrics.

10. The method of claim 1, wherein the inter-story similarity metrics are comprised of at least one term frequency-inverse event frequency model and where the events are classified based on at least one of: story labels and a predictive model.

11. The method of claim 1 further comprising the step of determining a subset of stories from the source-identified story corpus and the source-identified new story based on at least one story characteristic.

12. The computer-implemented method of claim 1, in which the new event indicator is displayed on at least one of a visual, audio or tactile output device.

13. A computer-implemented method of detecting new events comprising the steps of:
  determining at least one story characteristic based on an average story similarity story characteristic and a same event-same source story characteristic;
  determining a source-identified story corpus, each story associated with at least one event;
  determining a source-identified new story associated with at least one event;
  determining story-pairs based on the source-identified new-story and each story in the source-identified story corpus;
  determining at least one inter-story similarity metric for the story-pairs; wherein the inter-story similarity metrics are comprised of at least one story frequency model and at least one story characteristic frequency model combined using terms weights; and wherein an inverse event frequency is determined based on term t, and events e and rmax in the set of rule of interpretation (ROI) categories from the formula:

$$IEF(t) = \log\left[\frac{N_{e,rmax}}{ef_{rmax}(t)}\right]$$

wherein $N_e$rmax is the number of events in ROI max;
  determining at least one adjustment to the inter-story similarity metrics based on at least one story characteristic; and
  outputting a new story event indicator if the event associated with the new story is of a determined similarity or dissimilarity to the events associated with the source-identified story corpus based on the inter-similarity metrics and adjustments.

14. A computer-implemented method of detecting new events comprising the steps of:
  determining at least one story characteristic based on an average story similarity story characteristic and a same event-same source story characteristic;
  determining a source-identified story corpus, each story associated with at least one event;
  determining a source-identified new story associated with at least one event;
  determining story-pairs based on the source-identified new-story and each story in the source-identified story corpus;
  determining at least one inter-story similarity metric for the story-pairs; wherein the inter-story similarity metrics are comprised of at least one story frequency model and at least one story characteristic frequency model combined using terms weights; and wherein an inverse event frequency is determined based on term t, categories e, r and rmax in the set of rule of interpretation (ROI) categories and P(r), the probability of ROI r from the formula:

$$IEF'(t) = \sum_{r \in R} P(r) \log\left[\frac{N_{e,r}}{ef(r,t)}\right]$$

wherein r is an ROI category;
  determining at least one adjustment to the inter-story similarity metrics based on at least one story characteristic; and
  outputting a new story event indicator if the event associated with the new story is of a determined similarity or dissimilarity to the events associated with the source-identified story corpus based on the inter-similarity metrics and adjustments.

* * * * *